United States Patent
Xiao et al.

(10) Patent No.: US 10,533,494 B2
(45) Date of Patent: Jan. 14, 2020

(54) SOLAR CHEMICALLY RECUPERATED GAS TURBINE SYSTEM

(71) Applicant: Zhejiang University, Hangzhou (CN)

(72) Inventors: Gang Xiao, Hangzhou (CN); Tianfeng Yang, Hangzhou (CN); Mingjiang Ni, Hangzhou (CN); Zhongyang Luo, Hangzhou (CN); Xiang Gao, Hangzhou (CN); Kefa Cen, Hangzhou (CN); Mengxiang Fang, Hangzhou (CN); Jinsong Zhou, Hangzhou (CN); Zhenglun Shi, Hangzhou (CN); Leming Cheng, Hangzhou (CN); Qinhui Wang, Hangzhou (CN); Shurong Wang, Hangzhou (CN); Chunjiang Yu, Hangzhou (CN); Tao Wang, Hangzhou (CN); Chenghang Zheng, Hangzhou (CN)

(73) Assignee: Zhejiang University, Hangzhou (CN)

( * ) Notice: Subject to any disclaimer, the term of this patent is extended or adjusted under 35 U.S.C. 154(b) by 312 days.

(21) Appl. No.: 15/489,060

(22) Filed: Apr. 17, 2017

(65) Prior Publication Data
US 2017/0298818 A1   Oct. 19, 2017

(30) Foreign Application Priority Data

Apr. 15, 2016 (CN) .......................... 2016 1 0236918
Nov. 30, 2016 (CN) .......................... 2016 1 1077755

(51) Int. Cl.
*F02C 3/30* (2006.01)
*F02C 3/04* (2006.01)
(Continued)

(52) U.S. Cl.
CPC ................. *F02C 3/30* (2013.01); *F02C 3/04* (2013.01); *F02C 6/10* (2013.01); *F03G 6/064* (2013.01);
(Continued)

(58) Field of Classification Search
CPC ...... F02C 3/00; F02C 3/04; F02C 3/05; F02C 3/30; F02C 6/10; F03G 6/064; F23L 15/00; Y02E 20/00; Y02E 20/10; Y02E 20/16
See application file for complete search history.

(56) References Cited

U.S. PATENT DOCUMENTS

| 6,233,914 B1 * | 5/2001 | Fisher ..................... F01K 23/10 60/39.12 |
| 6,237,337 B1 * | 5/2001 | Bronicki ................. F01K 23/10 60/39.182 |

(Continued)

FOREIGN PATENT DOCUMENTS

| CN | 102606310 A | 7/2012 |
| CN | 104963776 A | 10/2015 |

OTHER PUBLICATIONS

English translation of the Chinese Office Action dated Nov. 1, 2017 for corresponding Chinese Application No. 201611077755.7.

*Primary Examiner* — Todd E Manahan
*Assistant Examiner* — Eric W Linderman
(74) *Attorney, Agent, or Firm* — David D. Brush; Westman, Champlin & Koehler, P.A.

(57) ABSTRACT

A solar chemically recuperated gas turbine system includes an exhaust-gas reformer, a solar reformer and a gas turbine unit with a combustion chamber. The reaction outlet of the exhaust-gas reformer is connected to the inlet of the solar reformer, the flue gas side inlet of the exhaust-gas reformer is connected to the exhaust-gas outlet of the gas turbine. The solar reformer outlet is connected to the combustion cham-
(Continued)

ber inlet. Combustion gas drives the gas turbine after fuel burns in the combustion chamber, and the exhaust gas enters the exhaust-gas reformer. Fuel and steam are mixed and enter the reaction side of the exhaust-gas reformer through a fuel inlet. A reforming reaction between the fuel and steam under heating of the exhaust gas generates syngas. A further reforming reaction occurs by absorbing concentrated solar energy after the syngas enters the solar reformer, and the reactant is provided to combustion chamber.

9 Claims, 6 Drawing Sheets

(51) Int. Cl.
| | |
|---|---|
| *F02C 6/10* | (2006.01) |
| *F03G 6/06* | (2006.01) |
| *F23R 3/00* | (2006.01) |
| *F23L 15/00* | (2006.01) |
| *F03G 6/00* | (2006.01) |
| *F04D 19/02* | (2006.01) |
| *F04D 29/58* | (2006.01) |

(52) U.S. Cl.
CPC ............ *F23L 15/00* (2013.01); *F23R 3/00* (2013.01); *F23R 3/005* (2013.01); *F03G 2006/008* (2013.01); *F04D 19/02* (2013.01); *F04D 29/5826* (2013.01); *F05D 2220/32* (2013.01); *F05D 2240/35* (2013.01); *F23K 2401/10* (2013.01); *F23R 2900/00002* (2013.01); *Y02E 10/46* (2013.01); *Y02E 20/348* (2013.01); *Y02P 20/134* (2015.11)

(56) References Cited

U.S. PATENT DOCUMENTS

| | | | |
|---|---|---|---|
| 6,321,539 B1* | 11/2001 | Bronicki | F01K 23/067 60/641.8 |
| 6,510,695 B1* | 1/2003 | Fisher | F02C 6/10 60/39.12 |
| 6,832,485 B2* | 12/2004 | Sugarmen | C01B 3/34 60/39.12 |
| 8,674,532 B2* | 3/2014 | Wei | F02C 3/22 290/2 |
| 9,909,496 B2* | 3/2018 | Chen | F03G 6/02 |
| 2003/0097843 A1* | 5/2003 | Sugarmen | C01B 3/34 60/780 |
| 2019/0153937 A1* | 5/2019 | Palmer | F02C 1/06 |

* cited by examiner

SOLAR CHEMICALLY RECUPERATED GAS TURBINE SYSTEM

The application claims the priority of Chinese Patent Application No. 201610236918.5, filed on Apr. 15, 2016, entitled "solar chemically recuperated gas turbine system and method", and Chinese Patent Application No. 201611077755.7, filed Nov. 30, 2016, which are incorporated by reference herein in their entireties.

TECHNICAL FIELD

The present invention relates to energy technologies, particularly to a solar chemically recuperated gas turbine system.

BACKGROUND ART

The global total solar radiation energy is about $1.7 \times 10^{17}$ W, whose 1% belongs to China ($1.8 \times 10^{15}$ W, equivalent to 1,900,000 million tons of standard coal per year), and it is 680 times of annual total energy consumption in China. Electricity is the most consumed secondary energy. Solar power generation technology is an effective way to relieve the current energy crisis and it has a very extensive application prospect.

The solar power generation technology is usually classified into photovoltaic (PV) power generation and solar thermal power generation. The PV power generation is mainly based on the photoelectric effect of the photovoltaic cell panel. However, this technology mainly has three drawbacks: (1) power generation varies with the solar intensity, and the power cannot be generated in the night and rainy days, which will greatly affect the power grid; (2) since the solar flux density is low, the area of the required PV cell panel for unit power generation capacity is large, and the production process of the PV cell causes serious pollution and high cost; (3) the solar spectral response bands of the PV panels are mainly concentrated in the high frequency region ($400 < \lambda < 1100$ nm) and the power of the low frequency region is mostly transformed into heat, which increases the temperature of the PV cell and decreases the photoelectric conversion efficiency and the service life. The PV power generation technology itself is difficult to overcome the problem of discontinuous power generation at day and night, and is usually equipped with storage batteries or an energy-storage generating system (such as storage hydropower station), so that the cost will be very high.

The solar thermal power generation is mainly classified into solar trough thermal power generation, solar linear Fresnel thermal power generation, solar tower thermal power generation, and solar dish thermal power generation. The fundamental principle for the solar thermal power generation is to focus the sunlight by parabolic reflectors (trough concentrators, linear Fresnel concentrators, heliostats and dish concentrators), and to produce steam or heat other fluid by photothermal conversion or heat exchangers, so as to drive the heat engine to generate power. The advantage of this technology is that the whole band of sunlight can be absorbed, and the continuous power generation is available by using thermal energy storage or by fuel supplement.

The heat engine used in the conventional solar thermal power generation systems is steam turbine, whose system is complex and has a low efficiency. The gas turbine system is also a heat engine and a simple gas turbine system consists of a compressor, a combustion chamber and a gas turbine. The gas turbine system has many advantages, such as high specific power, low vibration noise, long service life and easy maintenance. However, the simple gas turbine cycle has a low cycling efficiency and the heat loss of exhaust gas is large, for which the simple gas turbine is usually combined with Rankine cycle to promote the overall system efficiency.

A common solar power gas turbine system adds a solar air receiver to the simple solar gas turbine system, in which the compressed air from the compressor is preheat by a solar air receiver, and then enters the combustion chamber to produce high temperature gas which finally drives the gas turbine to work.

Compared with the simple gas turbine system, the solar gas turbine system increases the heat of the air entering the combustion chamber to reduce the fuel consumption. However, whether it is a simple gas turbine system or a solar gas turbine system, exhaust gas temperature of its gas turbine is very high and heat loss is very large. Although the combined gas-steam cycle system can be used to improve system efficiency, it's too complicated in technology and high in cost.

SUMMARY OF THE INVENTION

An exemplary embodiment of the present invention provides a solar chemically recuperated gas turbine system, including an exhaust-gas reformer, a solar reformer and a gas turbine unit with a combustion chamber and a gas turbine;

Wherein the reaction side outlet of the exhaust-gas reformer is connected to the inlet of the solar reformer, the flue gas side inlet of the exhaust-gas reformer is connected to the exhaust-gas side of the gas turbine, and the exhaust-gas reformer is equipped with a fuel inlet;

The outlet of the solar reformer is connected to the inlet of the combustion chamber, the combustion gas drives the gas turbine to work after the fuel burns in the combustion chamber, and the exhaust gas enters the exhaust-gas reformer;

The fuel and steam are mixed and enter the reaction side of the exhaust-gas reformer through the fuel inlet, with a reforming reaction between the fuel and steam occurring under the heating of the exhaust gas and generate syngas, and a further reforming reaction occurring by absorbing the concentrated solar energy to produce syngas which is provided for the combustion chamber.

Compared with the prior technology, the present invention adds an exhaust reformer and a solar reformer in the solar chemically recuperated gas turbine system. Wherein the waste heat is recovered from the exhaust to heat the exhaust reformer, which reduce the exhaust loss and increase the system efficiency. The present system is simpler and more compacted than that combined with a complicated Rankine cycle, and it is also convenient for installation and maintenance. Instead of the application of the complicated Rankine cycle, the present system is simplified and compacted, which benefits the installation and maintenance. In the present invention, the solar reformer heats the syngas for further reforming reaction, which increases the share of the solar energy, reduces the fuel consumption and emission, and finally improved the economic benefit of solar power plant. In addition, since the syngas finally entering the combustion chamber contains a large amount of hydrogen and steam, the flame temperature in the combustion chamber can be decreased, and the nitrogen oxide emissions are greatly reduced.

Preferably, the solar chemically recuperated gas turbine system further includes a mixer, a heat recovery steam generator, and a fuel compressor.

The mixer is connected to the steam outlet of the water side of the heat recovery steam generator, the fuel inlet of the exhaust-gas reformer and the outlet of the fuel compressor, respectively.

The flue gas side of the heat recovery steam generator is connected to the fuel side of the exhaust-gas reformer, and the heat recovery steam generator is equipped with a feed water inlet.

The feed water enters the heat recovery steam generator through the feed water inlet, evaporates into steam by the heat of the exhaust gas, and enters the mixer; then the fuel and the steam are mixed in the mixer, and enter the exhaust-gas reformer through the fuel inlet.

Using the exhaust gas to heat the steam in the heat recovery steam generator to saves the energy consumption, thus further improves the overall efficiency and reduces energy consumption and pollution emissions.

More preferably, the solar chemically recuperated gas turbine system further includes an exhaust gas condenser.

An exhaust gas outlet is equipped at the flue gas side of the heat recovery steam generator, and the exhaust gas outlet is connected to the exhaust gas condenser; the exhaust gas emitted from the exhaust gas outlet enters the exhaust gas condenser, the steam in the exhaust gas condenses in the exhaust gas condenser, and the condensed water is recycled.

The water consumption of the system and the production cost are reduced by setting the exhaust gas condenser and recycling the condensate water.

Preferably, the reaction side of the exhaust gas reformer and/or the solar reformer is filled with nickel-based catalysts. The use of the nickel-based catalysts can improve the reaction efficiency of the exhaust gas reformer and the solar reformer, so as to accelerate the reforming reaction.

More preferably, the solar chemically recuperated gas turbine system further includes a solar air receiver, which is connected to the combustion chamber.

The air enters the solar air receiver, enters the combustion chamber after being heated by the concentrated sunlight, and then burns with the fuel.

Using the solar air receiver to heat the air entering the combustion chamber not only improves the reaction efficiency in the combustion chamber, making the reaction more complete, but also decreases the fuel consumption and cost caused by preheating the air.

More preferably, the solar chemically recuperated gas turbine system further includes a compressor assembly, whose outlet is connected to the solar air receiver.

The air enters the compressor assembly and enters the solar air receiver after being compressed.

The compressed air enters the solar air receiver, which increases the heat of unit volume air and promotes the performance of the solar air receiver.

More preferably, the compressor module includes a low-pressure compressor, a high-pressure compressor and an intercooler between the low-pressure compressor and the high-pressure compressor.

The intercooler is used for cooling the compressed air from the low-pressure compressor.

Setting the intercooler greatly decreases the temperature of air entering the high-pressure compressor, which reduces the power consumption of the high-pressure compressor and improves the system efficiency.

Preferably, in the present invention, the solar air receiver is selected from one or both of a tubular heat collector and a volumetric heat collector.

Preferably, in the present invention, the concentrated sunlight for the solar air receiver is provided by one or more of a tower concentrator system, a dish concentrator system, a trough concentrator system, and a linear Fresnel concentrator system.

Preferably, in the present invention, the concentrated sunlight for the solar reformer is provided by one or more tower concentrator system, a dish concentrator system, a trough concentrator system, and a linear Fresnel concentrator system.

Preferably, the fuel is selected from one or more gas, liquid or solid fuels. The gas fuel includes the natural gas and shale gas; the liquid fuel includes diesel and bio-oil; the solid fuel includes coal and bio-charcoal.

DETAILED DESCRIPTION OF THE PREFERRED EMBODIMENTS

First Embodiment

Figure 1:
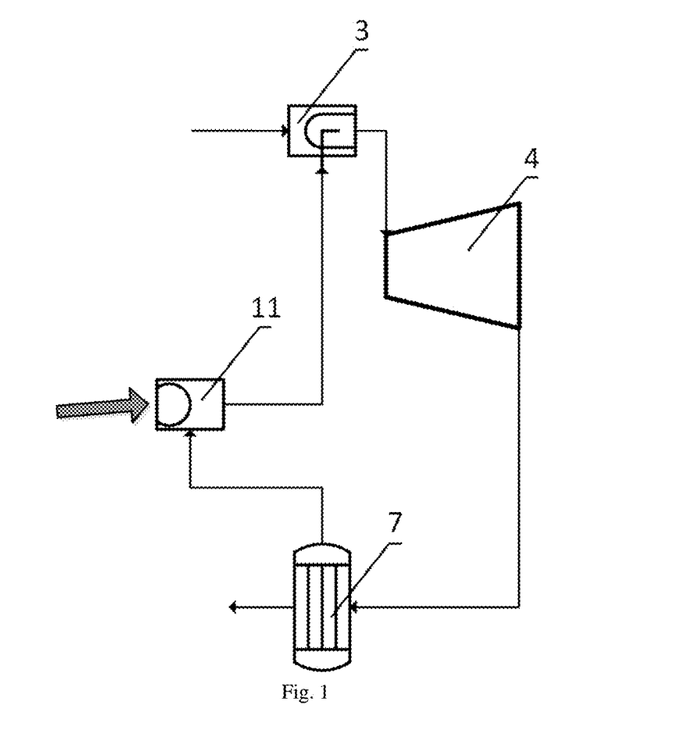
FIG. 1 is a schematic diagram of the solar chemically recuperated gas turbine system according to the first embodiment of the present invention.

The first embodiment proposes a solar chemically recuperated gas turbine system, as shown in FIG. 1, including an exhaust gas reformer 7, a solar reformer 11, and a gas turbine unit with a combustion chamber 3 and a gas turbine 4.

The reaction side outlet of the exhaust-gas reformer 7 is connected to the inlet of solar reformer 11, the flue gas side inlet of the exhaust-gas reformer 7 is connected to the exhaust gas side of the gas turbine 4, and the exhaust-gas reformer 7 is provided with a fuel inlet.

The outlet of the solar reformer 11 is connected to the inlet of the combustion chamber 3, the combustion gas drives the gas turbine 4 to work after fuel burns in the combustion chamber 3, and the exhaust gas enters the exhaust-gas reformer 7.

The fuel and steam after mixing enter the reaction side of the exhaust-gas reformer 7 through the fuel inlet, a reforming reaction between the fuel and the steam takes place under the heating of the exhaust gas and generates syngas, and a further reforming reaction takes place by absorbing the concentrated solar energy after the syngas enters the solar reformer 11, and the reactant is provided for the combustion chamber 3.

The exhaust gas reformer 7, in which the exhaust gas heats the mixture of steam and fuel, is divided into the flue gas side and the reaction side. The exhaust gas flows through the flue gas side and provides the heat required for the reaction. The reforming reaction takes place and the syngas is produced in the reaction side. Taking $CH_4$ and steam for example, the reforming reaction equations are showed as follows:

$$CH_4 + H_2O = CO + 3H_2;$$

$$CO + H_2O = CO_2 + H_2.$$

After the reforming reaction, the syngas is a mixture of $CH_4$, steam, CO, $CO_2$, and $H_2$. The outlet temperature of the syngas can reach 500° C. or more. Since the overall reaction is endothermic, exhaust heat of the exhaust gas can be recycled and the heat loss is reduced, so as to improve the system efficiency. Obviously, the reforming reaction in the exhaust gas reformer 7 is not limited to the above reaction and can be other forms of reaction.

The concentrated sunlight in the solar reformer 11 further heats the syngas from the reaction side of the exhaust gas reformer 7, which accelerates the further reforming reaction between $CH_4$ and steam. The outlet temperature of the syngas can reach 800° C. or more. The reaction mechanism is consistent with that of the exhaust gas reformer 7, in which solar energy is absorbed to the power cycle, so that the proportion of solar energy utilization is greatly improved and the fuel consumption is reduced.

In this embodiment, the concentrated sunlight of the solar reformer 11 is provided by one or more tower concentrator systems including a dish concentrator system, a trough concentrator system, and a linear Fresnel concentrator system. Those of ordinary skill in the art can choose the type of the solar reformer 11 according to the actual requirement, and the type of the solar reformer is not limited by the technical scheme of the present invention.

In this embodiment, the fuel is selected from one or more gas, liquid or solid fuels. The gas fuel includes the natural gas and shale gas; the liquid fuel includes diesel and bio-oil; the solid fuel includes coal and bio-charcoal. Specific fuel can be chosen according to the combustion chamber 3, and therefore, is not limited to the above types.

Compared with the prior technology, the present invention adds an exhaust reformer and a solar reformer in the solar chemically recuperated gas turbine system. The waste heat is recovered from the exhaust to heat the exhaust reformer, which reduce the exhaust loss and increase the system efficiency. The present system is simpler and more compacted than that combined with a complicated Rankine cycle, and it is also convenient for installation and maintenance. In the present invention, the solar reformer heats the syngas for further reforming reaction, which increases the share of the solar energy, reduces the fuel consumption and emission, and finally improved the economic benefit of solar power plant. In addition, since the syngas finally entering the combustion chamber contains a large amount of hydrogen and steam, the flame temperature in the combustion chamber can be decreased, and the nitrogen oxide emissions are greatly reduced.

Second Embodiment

The second embodiment proposes a solar chemically recuperated gas turbine system, which improves the first embodiment. The main improvement is that the reaction side of the exhaust-gas reformer 7 and/or the solar reformer 11 is filled with nickel-based catalysts in the second embodiment.

The nickel-based catalysts can increase reaction rates and accelerate the reforming reaction in the exhaust gas reformer 7 and the solar reformer 11.

Third Embodiment

Figure 2:
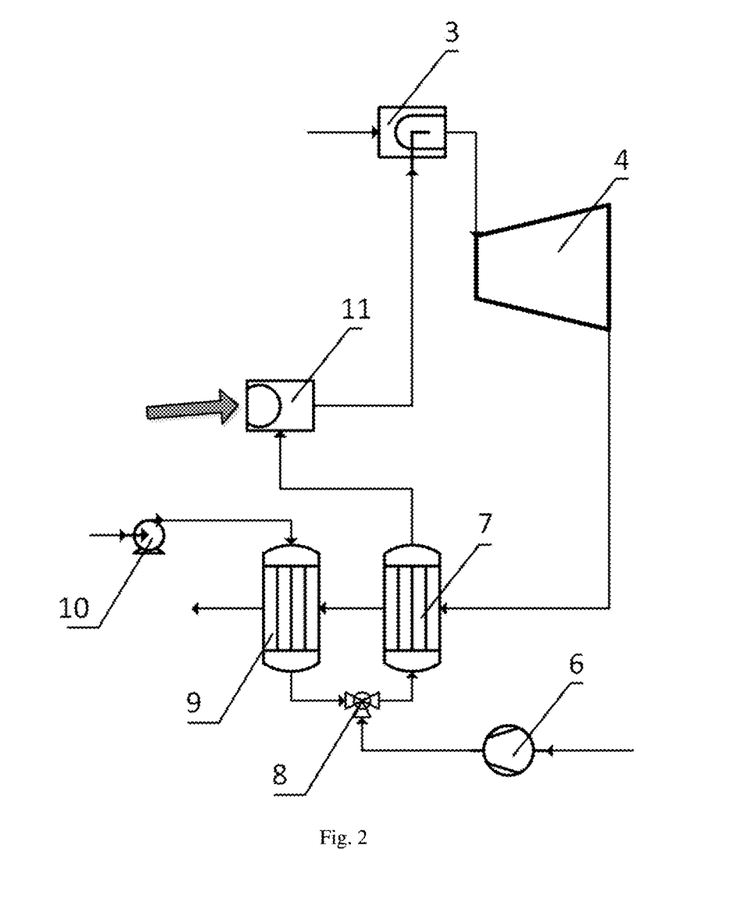
FIG. 2 is a schematic diagram of the solar chemically recuperated gas turbine system according to the third embodiment of the present invention.

The third embodiment proposes a solar chemically recuperated gas turbine system, which improves the first or second embodiment. The main improvement is that, as shown in FIG. 2, the solar chemically recuperated gas turbine system further includes a mixer 8, a heat recovery steam generator 9 and a fuel compressor 6.

The mixer 8 is connected to the steam outlet of the water side of the heat recovery steam generator 9, the fuel inlet of the exhaust-gas reformer 7 and the outlet of the fuel compressor 6, respectively.

The flue gas side of the heat recovery steam generator 9 is connected to the fuel side of the exhaust-gas reformer 7, and the heat recovery steam generator 9 is provided with a feed water inlet.

The feed water entering the heat recovery steam generator 9 through the feed water inlet, is evaporated into steam by the heat of the exhaust gas, and enters the mixer 8, then the fuel and the steam are mixed in the mixer 8, and enter the exhaust-gas reformer 7 through the fuel inlet.

Using the exhaust gas to heat the steam in the heat recovery steam generator 9 saves the energy consumption generated by using other systems, and thus further improves the overall efficiency and reduces energy consumption and pollution emission. According to calculation, the temperature of exhaust gas from the heat recovery steam generator 9 can be reduced to 130° C. The overall efficiency reaches 47%, which improves 11% compared with that of a simple gas turbine cycle. The ratio between solar energy input and fuel heat input is 4:1. Therefore, the fuel is saved greatly.

It is noted that the feed water is injected into the feed water outlet through a feed water pump 10, which ensures the pressure of the injected water.

Fourth Embodiment

Figure 3:
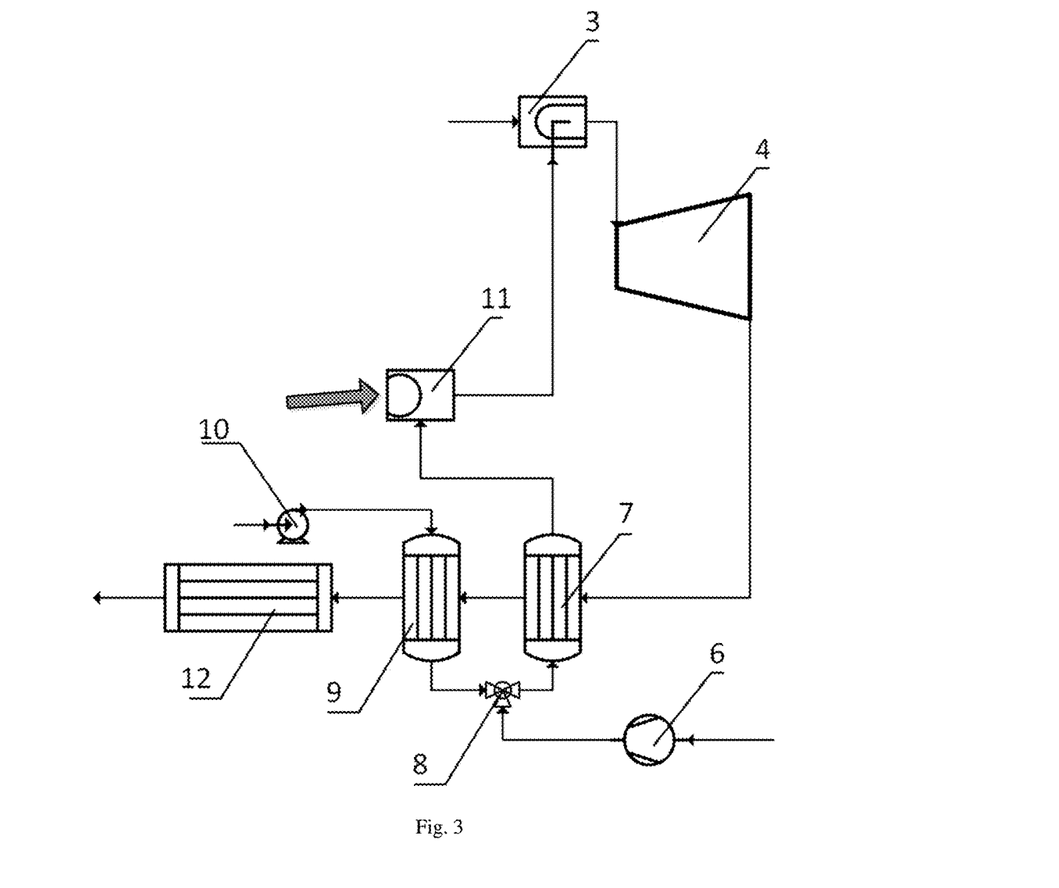
FIG. 3 is a schematic diagram of the solar chemically recuperated gas turbine system according to the fourth embodiment of the present invention.

The fourth embodiment proposes a solar chemically recuperated gas turbine system, which further improves the third embodiment. The main improvement is that, as shown in FIG. 3, that the solar chemically recuperated gas turbine system further includes an exhaust gas condenser 12.

An exhaust gas outlet is provided at the flue gas side of the heat recovery steam generator 9, and the exhaust gas outlet is connected to the exhaust gas condenser 12; the exhaust gas emitted from the exhaust gas outlet enters the exhaust gas condenser 12, the steam in the exhaust gas condenses in the exhaust gas condenser 12, and the condensed water is recycled.

The water consumption and the production cost of the system are largely reduced by recycling the condensate water through the exhaust gas condenser 12.

Fifth Embodiment

Figure 4:
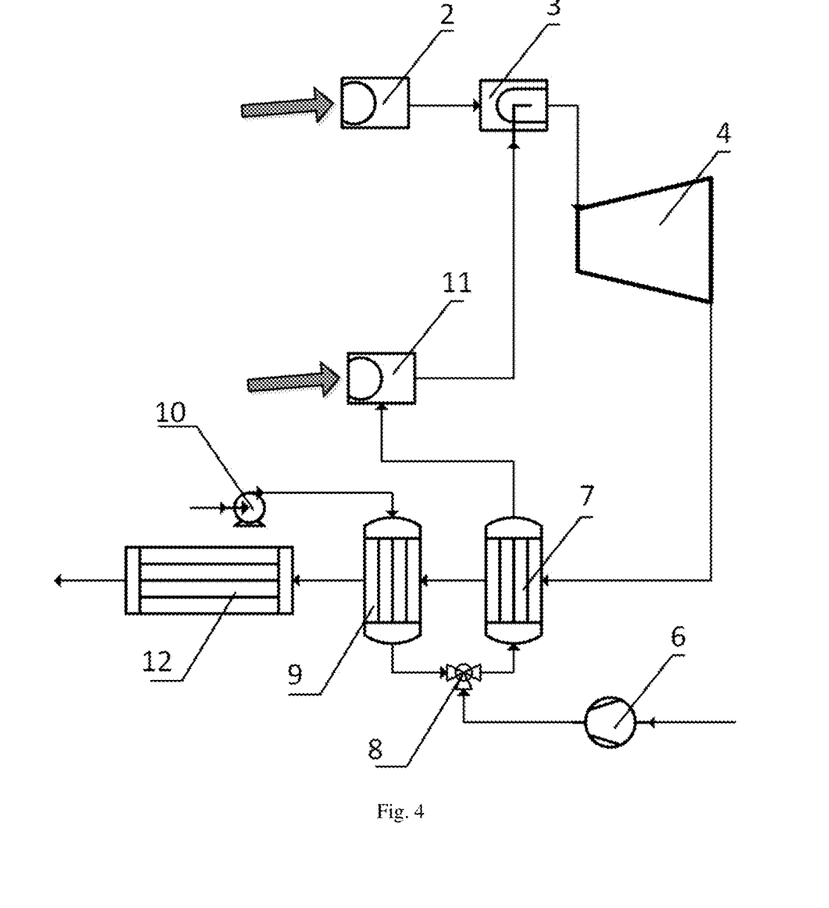
FIG. 4 is a schematic diagram of the solar chemically recuperated gas turbine system according to the fifth embodiment of the present invention.

The fifth embodiment proposes a solar chemically recuperated gas turbine system, which further improves one of the first to fourth embodiments. The main improvement is that, as shown in FIG. 4, the solar chemically recuperated gas turbine system further includes a solar air receiver 2, which is connected to the combustion chamber 3.

The air enters the solar air receiver 2, enters the combustion chamber 3 after being heated by the concentrated sunlight, and then burns with the fuel.

Using the solar air receiver 2 to heat the air entering the combustion chamber 3 not only improves the reaction efficiency in the combustion chamber 3 to make the reaction more complete, but also decreases the fuel consumption and cost by preheating the air.

It is noted that the solar air receiver is selected from one or both of a tubular collector and a volumetric collector in this embodiment. Those of ordinary skill in the art can choose the type of air receivers according to the actual requirement, and therefore, the air receivers are not limited to the above types.

Besides, in this embodiment, the concentrated sunlight of the solar air receiver 2 is provided by one or more tower concentrator system including a dish concentrator system, a trough concentrator system, and a linear Fresnel concentrator system. Similarly, those of ordinary skill in the art can choose the type of the concentrator system according to the actual requirement.

Sixth Embodiment

The sixth embodiment proposes a solar chemically recuperated gas turbine system, which further improves the fifth embodiment. The main improvement is that, as shown in FIG. 5, the gas turbine system further includes a compressor module 1, whose outlet is connected to the solar air receiver 2.

The air enters the compressor module 1 and then enters the solar air receiver 2 after being compressed.

The compressed air enters the solar air receiver 2, which increases the volumetric heat capacity and promotes the performance of the solar air receiver 2.

Figure 5:
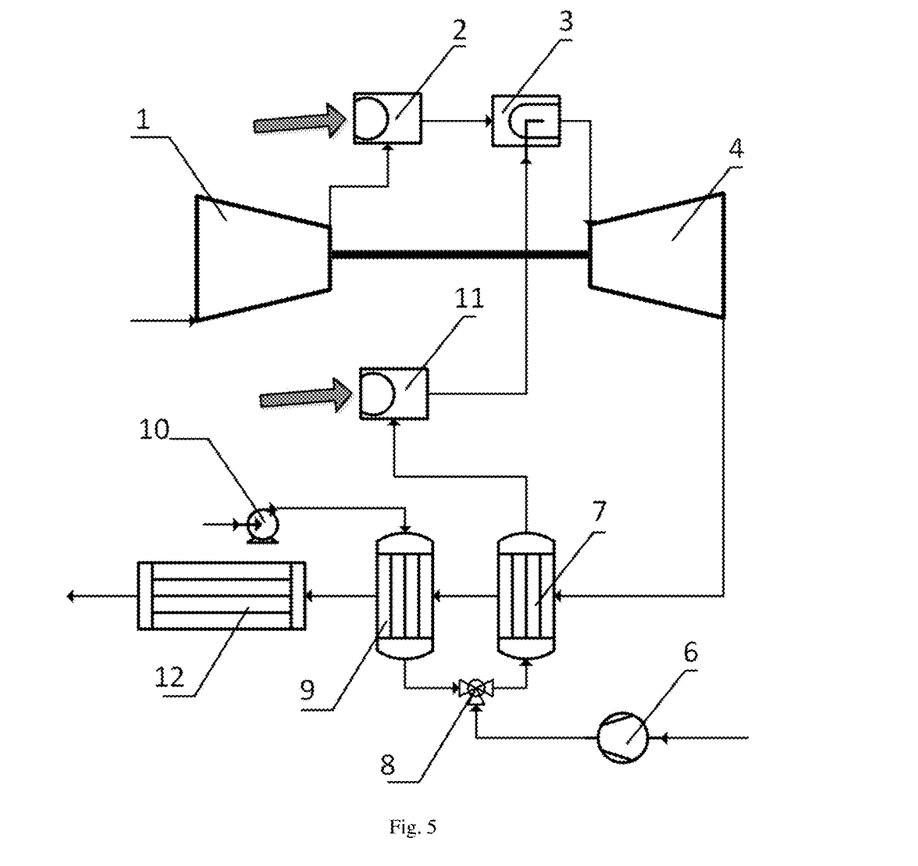
FIG. 5 is a schematic diagram of the solar chemically recuperated gas turbine system according to the sixth embodiment of the present invention.

It is noted that, as shown in FIG. 5, the compressor module 1 is connected to the gas turbine 4 through a rotation shaft in this embodiment. The rotation shaft of the gas turbine 4 drives the compressor assembly 1 to work, which can save the power source of the compressor assembly 1 and make the system simplified.

Seventh Embodiment

The seventh embodiment proposes a solar chemically recuperated gas turbine system, which further improves the sixth embodiment. The main improvement is that the compressor module 1 in the seventh embodiment includes a low-pressure compressor, a high-pressure compressor, and an intercooler between the low-pressure compressor and the high-pressure compressor.

The intercooler is used for cooling the compressed air from the low-pressure compressor.

Setting the intercooler greatly decreases the temperature of air entering the high-pressure compressor, which reduces the power consumption of the high-pressure compressor and improves the system efficiency.

Eighth Embodiment

Figure 6:
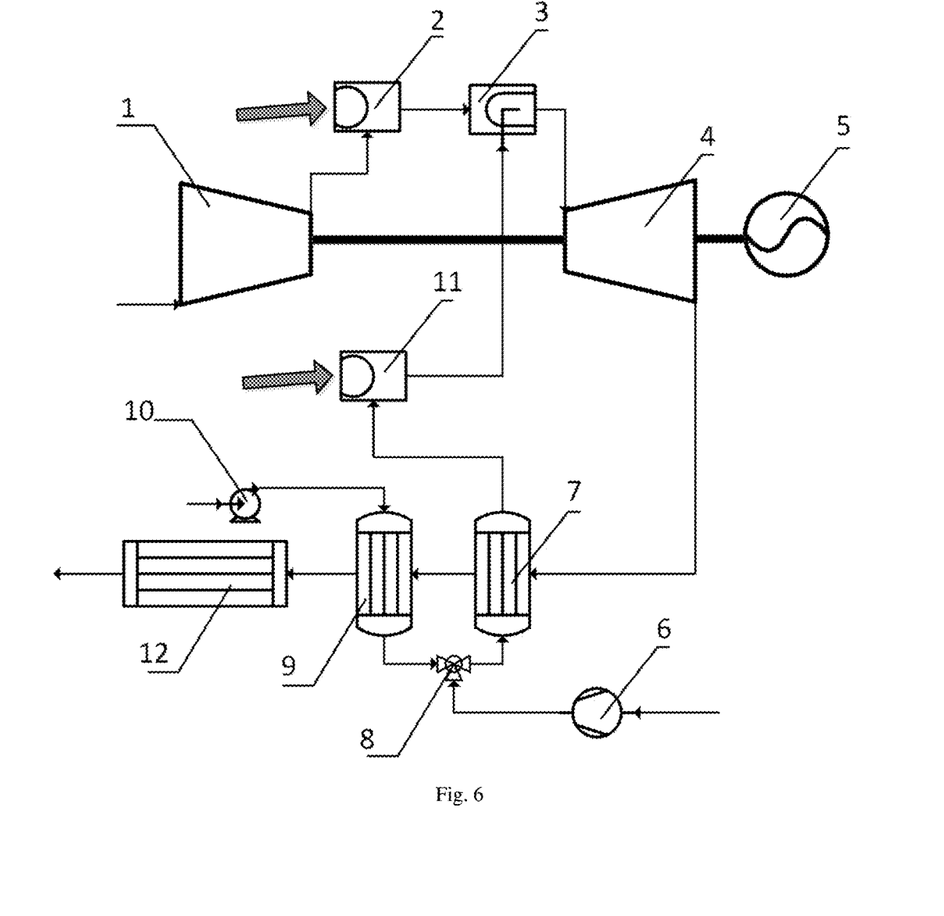
FIG. 6 is a schematic diagram of the solar chemically recuperated gas turbine system according to the eighth embodiment of the present invention.

The eighth embodiment proposes a solar chemically recuperated gas turbine system, which further improves one of the above embodiments. The main improvement is that, as shown in FIG. 6, the solar chemically recuperated gas turbine system further includes a generator 5.

The generator 5 is connected to the gas turbine 4 through a rotation shaft, and is driven directly by the gas turbine 4.

An exemplary embodiment of the present invention thus proposes a solar chemically recuperated gas turbine system, which can improve the energy utilization efficiency.

Those of ordinary skill in the art can understand that many technical details are proposed to provide readers with a better understanding of the present invention. However, even if there are no technical details and variations and modifications based on the above embodiments, the technical schemes required by the claims of the present application can be substantially realized. Therefore, in practice, various modifications can be made in form and detail to the above embodiments without departing from the spirit and scope of the present invention.

REFERENCE NUMERALS 1 compressor assembly
2 solar air receiver
3 combustion chamber
4 gas turbine
5 generator
6 fuel compressor
7 exhaust-gas reformer
8 mixer
9 heat recovery steam generator
10 feed water pump
11 solar reformer
12 exhaust gas condenser

We claim:

1. A solar chemically recuperated gas turbine system comprising:
    an exhaust-gas reformer, a mixer, a heat recovery steam generator, a fuel compressor, a solar reformer, and a gas turbine unit with a combustion chamber and a gas turbine, wherein,
    a reaction side outlet of the exhaust-gas reformer is connected to an inlet of the solar reformer, a flue gas side inlet of the exhaust-gas reformer is connected to an exhaust-gas side of the gas turbine, and the exhaust-gas reformer is provided with a fuel inlet;
    the mixer is connected to a steam outlet of a water side of the heat recovery steam generator, the fuel inlet of the exhaust-gas reformer and an outlet of the fuel compressor, respectively;
    a flue gas side of the heat recovery steam generator is connected to a fuel side of the exhaust-gas reformer, and the heat recovery steam generator is provided with a feed water inlet;
    an outlet of the solar reformer is connected to an inlet of the combustion chamber, wherein combustion gas drives the gas turbine to work after fuel burns in the combustion chamber, and exhaust gas enters the exhaust-gas reformer; and
    the solar chemically recuperated gas turbine system is arranged such that feed water enters the heat recovery steam generator through the feed water inlet, evaporates into steam by heat of the exhaust gas, and enters the mixer, then the fuel and steam are mixed in the mixer and enter the reaction side of the exhaust-gas reformer through the fuel inlet, a reforming reaction between the fuel and the steam takes place under heating of the exhaust gas and generates syngas, and a further reforming reaction takes place by absorbing concentrated solar energy after the syngas enters the solar reformer, and reactant is provided for the combustion chamber.

2. The solar chemically recuperated gas turbine system according to claim 1, further comprising an exhaust gas condenser, wherein,
an exhaust gas outlet is provided at the flue gas side of the heat recovery steam generator, and the exhaust gas outlet is connected to the exhaust gas condenser; the exhaust gas emitted from the exhaust gas outlet enters the exhaust gas condenser, the steam in the exhaust gas condenses of the exhaust gas condenser, and condensed water is recycled.

3. The solar chemically recuperated gas turbine system according to claim 1, wherein, at least one of the reaction side of the exhaust-gas reformer or the solar reformer is filled with nickel-based catalysts.

4. The solar chemically recuperated gas turbine system according to claim 1, further comprising a solar air receiver, wherein,
the solar air receiver is connected to the combustion chamber; and
air enters the solar air receiver, enters the combustion chamber after being heated by concentrated sunlight, and then burns with the fuel.

5. The solar chemically recuperated gas turbine system according to claim 4, further comprising a compressor module, wherein,
the outlet of the compressor module is connected to the solar air receiver; the air enters the compressor module and enters the solar air receiver after being compressed.

6. The solar chemically recuperated gas turbine system according to claim 5, wherein,
the compressor module includes a low-pressure compressor, a high-pressure compressor, and an intercooler between the low-pressure compressor and the high-pressure compressor;
the intercooler is configured to cool the compressed air from the low-pressure compressor.

7. The solar chemically recuperated gas turbine system according to claim 4, wherein,
the solar air receiver is selected from one or both of a tubular heat collector and a volumetric heat collector.

8. The solar chemically recuperated gas turbine system according to claim 4, wherein,
the concentrated sunlight of the solar air receiver is provided by one or more of a tower concentrator system, a dish concentrator system, a trough concentrator system, and a linear Fresnel concentrator system.

9. The solar chemically recuperated gas turbine system according to claim 1, wherein,
concentrated sunlight of the solar reformer is provided by one or more of a tower concentrator system, a dish concentrator system, a trough concentrator system, and a linear Fresnel concentrator system.

* * * * *